United States Patent [19]

Hager

[11] Patent Number: 4,933,381
[45] Date of Patent: Jun. 12, 1990

[54] RESIN COMPATIBLE SIZE COMPOSITION FOR SMALL DIAMETER GLASS FIBERS

[75] Inventor: Thomas P. Hager, Reynoldsburg, Ohio

[73] Assignee: Owens-Corning Fiberglas Corporation, Toledo, Ohio

[21] Appl. No.: 90,309

[22] Filed: Aug. 27, 1987

[51] Int. Cl.$^5$ .............................................. C08K 63/00
[52] U.S. Cl. ................................... 523/414; 523/420; 523/426
[58] Field of Search .................... 523/414, 420, 426

[56] References Cited

U.S. PATENT DOCUMENTS 4,341,877  7/1982  Das et al. .......................... 523/426

Primary Examiner—Joseph L. Schofer
Assistant Examiner—Peter D. Mulcahy
Attorney, Agent, or Firm—Patrick P. Pacella; Ted C. Gillespie; Catherine B. Martineau

[57] ABSTRACT

A resin compatible size composition for glass fibers having a small fiber diameter is disclosed. The size contains a film former, a nonionic lubricant, a cationic lubricant, at least one silane coupling agent and at least one acid, such as acetic or citric acid. The sized glass fibers are compatible with epoxy and polyester resins and are useful in producing yarns which are then braided, twisted or woven to form structural reinforcements.

7 Claims, No Drawings

RESIN COMPATIBLE SIZE COMPOSITION FOR SMALL DIAMETER GLASS FIBERS

BACKGROUND OF THE INVENTION

This invention relates to a resin compatible size composition for glass fibers having a relatively small diameter. The size composition is intended for glass fibers useful for making yarns to produce structural braid reinforcements.

Glass fiber yarns are useful in constructing structural braid reinforcements. Glass yarns having a small fiber diameter are preferred for use in making structural braid reinforcements since the glass yarns having a small fiber diameter are generally more resistant to damage than large diameter fibers. The small diameter glass fibers are sized with a starch-base finish in a separate operation, known as slashing, to process as warp ends. However, since starch-base finishes are not resin compatible the starch size must be removed from the glass fibers, usually thermally by a heat clean process. The glass fiber is then refinished with silane coupling agents to gain resin compatibility. These desizing and refinishing steps often reduce the tensile strength of the small diameter glass fibers.

As such, continuous glass strands having a resin compatible sizing are normally available only on large filament diameter strands. However, it is not as desirable to use large diameter glass fibers since these large diameter glass strands do not process well in braiding due to the large filament diameter and the high coefficient of friction generated during the braiding process.

Considerable expense could be saved if a size composition were available for use on small diameter glass fibers which is compatible with epoxy and polyester resins and which provides a glass fiber yarn comprised of small diameter glass fibers useful for making structural braid reinforcements.

This invention is directed to the solution of that problem.

SUMMARY OF THE INVENTION

According to this invention, there is provided a sizing for use with small fiber diameter glass yarn which displays excellent epoxy and polyester resin wetout and cured resin compatibility. Also, according to this invention, there is provided a sizing which allows small diameter fiber glass yarn to be processed on conventional winding and braiding equipment as efficiently as conventional starch-based or non-resin compatible sizings.

The size composition of the present invention will process both warp and fill yarns, especially when such yarns are used in airjet looms. The continuous filament glass fiber yarn can be used in typical textile processes such as twisting, winding and braiding.

DESCRIPTION OF THE INVENTION

This invention is employable with any glass fiber conventionally employed as reinforcement of resins. The term "glass fibers" as sued herein shall mean filaments formed by attenuation of one or more streams of molten glass and to strands formed when such glass fiber filaments are gathered together in forming. The term shall also mean yarns and cords formed by plying and/or twisting a multiplicity of strands together and to woven and non-woven fabrics which are formed of such glass fiber strands, yarns or cords. Preferably, the size composition of the present invention is usable with E-type fibers.

Similarly, the glass fiber can be employed to reinforce epoxy and polyester cured resins and the like. The size composition of the present invention is especially useful for sizing glass fibers having a small fiber diameter, usually in the range of about 3.5 to about 13.0 microns, preferably less than 10 microns. The small diameter glass fibers are useful for producing yarns which are then braided to produce structural reinforcements. It is also contemplated that the continuous filament glass fiber yarn can be used in other textile processes such as twisting and winding and such uses are considered to be within the scope of this invention.

The size composition of the present invention offers a coated glass fiber which has a high performance in its end use due to the coated glass fibers' high tensile strength. The size composition also offers substantial economical savings since slashing and heat cleaning steps are not required in the processing of the glass fibers.

The size composition can be applied to the glass strands in any suitable manner. For example, the strand can be run through a vat of the coating with, or without, subsequent wiping. Alternatively, the size can be rolled on or spray applied onto the glass strands.

It is typical of most sizing compositions to include film formers, lubricants, and silane coupling agnets. What distinguishes the sizing formulation of the present invention from other resin compatible formulations is that the film former to lubricant ratio is practically inverted. This imparts very good processability while still maintaining resin compatibility.

The range of the ingredients comtemplated ( to be within the scope of the invention are noted in Table I below.

TABLE I

| Ingredients | Range (wt. solids/mix solids) |
| --- | --- |
| Film Former | 12.0%–68.0% |
| Nonionic Lubricant | 13.0%–54.0% |
| Cationic Lubricant | 10.0%–54.0% |
| A-174 (gamma-methacryl silane) | 0%–20.0% |
| A-1100 Organosilane Coupling Agent (amino silane) | 0%–10.0% |
| Citric Acid (nonvolatile acid) | 0%–2.0% |
| Acetic Acid (volatile acid) | 0%–5.0% |
| Water (total mix solids) | 2.0 ± 10.0 |

A preferred size composition has the chemical formulation listed in Table II below.

TABLE II

| Ingredients | Range (wt. solids/mix solids) |
| --- | --- |
| Film Former Epoxy Emulsion | 25.5 ± 2.0 |
| Nonionic Lubricant Sulphonated Mineral Oil | 39.7 ± 5.0 |
| Catonic Lubricant Polyamine Lubricant | 12.8 ± 2.0 |
| γ-Methacryloxypropyl Trimethoxy Silane | 15.3 ± 3.0 |
| γ-Aminopropyl Triethoxy Silane | 5.9 ± 2.0 |
| Citric Acid | .8 ± 0.2 |
| Acetic Acid | (0.03% mix weight) |
| Mix Solids | 6.0 ± 0.50 |

In a preferred embodiment the various ingredients include AD-502 epoxy emulsion which is composed of DER 337, a Dow Chemical epoxy resin that is a reaction of bisphenol-A and epichlorohydrin to give an epoxide equivalent weight of 230-250. Emerlube 7440 which is available from Emery Industries, Inc., is a mineral oil which is based on mineral or process oil and is emulsified with a nonionic ethoxylated fatty ester and an alkonolamide, the latter which also has antistatic properties.

Any suitable cationic lubricant can be employed in the successful practice of this invention. Particularly preferred cationic lubricants include polyamines such as "K12" which is a condensate of tetraethylenepentaamine with stearic acid, or Emery 6760 which is available from the Emery Chemicals Company in Cincinnati, Ohio. which is a water soluble cationic lubricant comprised of polyethyleneimine salt of fatty acids.

Any suitable organosilane coupling agent conventionally employed in aqueous based glass sizes can be employed in the successful practice of the present invention. Particularly preferred organosilanes are gamma-aminopropyltriethoxysilane commercially available from Union Carbide Corporation under the tradename "A-1100", and gamma-methacryloxypropyltrimethoxysilane commercially available from Union Carbide under the tradename "A-174".

Suitable acids include citric acid and acetic acid.

The materials of the size composition of the present invention can be mixed in any suitable manner. The following is an example of an epoxy/polyester compatible yarn for structural braiding. This example outlines the raw materials required and the recommended procedure for mixing an epoxy yarn size for use in the forty-five gallon portable sumps.

FORMULATIONS

| Ingredients | Pounds/200 Gallons |
|---|---|
| AD-502 | 51.0 |
| Emerlube 7440 | 42.0 |
| Emery 6760U | 22.5 |
| Acetic Acid (25%) | 5.0 |
| A-174 or Z6030 | 17.6 |
| A-1100 | 6.9 |
| Citric Acid | 1.0 |

The composition of this invention is best produced by blending all materials in their liquid stage with agitation. A preferred mixing procedure is as follows: In a main mix tank, add 50 gallons of D.M. water. Turn agitator on slow speed. To a first premix kettle, add 20 gallons of D.M. water; slowly add 51.0 pounds of AD-502; and, agitate for 5 minutes and drop into main mix tank. To a second premix kettle, add 20 gallons of D.M. water; start the agitator on slow and add 42.0 pounds of Emerlube 7440 and 22.5 pounds of Emery 6760U; and, agitate for 10 minutes and drop into the main mix tank. To a third premix kettle, add 40 gallons of D.M. water; start agitation and add 5.0 pounds of 25% acetic acid; slowly add 17.6 pounds of A-174; hydrolyze the A-174 for one hour under medium agitation; and, drop the A-174 premix into the main mix tank. To a fourth premix kettle, add 20 gallons of D.M. water; start agitation; slowly add 6.9 pounds of A-1100; and, stir for 10 minutes and drop into the main mix tank. To a bucket, add 1.0 pound of citric acid; add 2 gallons of water and stir until completely dissolved; and, drop into the main mix tank. Thereafter, check mix solids and adjust to 6.0±0.2% water.

The size composition functions both as warp and fill without need for slashing, that is, applying the composition as a coating in a separate operation. In some embodiments of the invention it may be preferrable to oven dry the yarn prior to twisting or braiding. This may be accomplished in one or a combination of methods. For example, oven dry only warp yarns while using air surge or fill yarns, as conventionally done. The oven drying imparts high strand integrity to the yarn and offers increased abrasion resistance. Air drying allows the strand to remain open which allows more loft and easier insertion into the filling direction on an airjet loom. Alternatively, oven dry all yarns by mechanically working fill yarns, running yarn over and under guide bars, for example, while twisting or weaving, before insertion into a fabric. This helps open the strand up and thus increases loft.

The epoxy/polyester compatible yarn is useful for making various structural shapes and in various industrial applications. Almost any cylindrical or cylindrical-like shape can be braided.

Generally, a structural braid reinforcement combines yarns in an oriented pattern over a mandrel or form which, when impregnated with resin and cured, results in a rigid composite that is both lightweight and yet displays high strength and modulus. Structural braiding for reinforcing composites permits planned cross-directional fiber-orientation to control tensile strength. The braid is conformable, that is, it follows the shape of most cylindrical or cylindrical-like forms. Braiding is more predictable than hand lay-up processes, thereby ensuring repeatable processing from one part to the next. The braid configuration inherently resists twisting and thus displays torque stability. Braid configuration can be varied over the length of the product, producing variable fiber angle and, thus, controlled performance. Composite structural braids have been shown to exhibit outstanding impact characteristics. Further, the braiding is a more cost effective process than hand lay-up processes.

Examples of braided structural shapes are: snow skis, baseball bats, gold club shafts, ski poles, hockey sticks, lighting poles, aircraft stiffeners, airfoils, ducting, rocket launcher tubes, canoe paddles, bike frames, boat building joints, automobile center posts, and braided input for pultruded products.

Examples of other industrial applications include: knitted fabrics for light weight marine laminates and input to reinforcing or insulating tapes, e.g., armiture banding tapes for direct current motors.

The tensile strength and modulus test data of small fiber diameter glass yarns having various constructions sized with the sizing composition are compared to a starch-based size:

| Sample Designation | Yarn Construction | Tensile (lbs) |
|---|---|---|
| Resin compatible size | G75 1/0 0.7 z | 13.1 |
| Starch-based size | G75 1/0 0.7 z | 9.6 |
| Resin compatible size | G150 1/0 0.7 z | 4.6 |
| Starch-based size | G150 1/0 0.7 z | 3.5 |
| Resin compatible size | G75 1/2 2.8 s | 11.5 |
| Starch-based size | G75 1/2 2.8 s | 10.0 |

The data show a 15-46% increase in measured tensile strength of the epoxy binder relative to typical starch binders.

It will be evident from the foregoing that various modifications can be made to this invention. Such, however, are considered within the scope of the invention.

I claim:

1. An aqueous size composition for glass fibers comprising an epoxy film former resin, a nonionic lubricant, a cationic lubricant, at least one organosilane coupling agent, and at least one acid selected from the group including a volatile acid and a nonvolatile acid, wherein the size composition is applied to glass fibers having a diameter in the range of approximately 3.5 to about 13.0 microns and wherein the sized glass fibers are compatible with epoxy and polyester resin; the aqueous size composition comprising in percentage of wt. solids/mix solids, the epoxy film former resin comprising a diglycidyl ether of bisphenol-A in the range of about 12.0 to 68%; the nonionic lubricant in the range of about 13.0 to 54%; the cationic lubricant in the range of about 10.0 to 54%; the organosilane coupling agent selected from the group consisting of gamma-methacryloxypropyltrimethoxysilane in the range of about 0 to 20.0% and gamma aminopropyltriethoxysilane in the range of about 0 to 10.0%; the nonvolatile acid comprising citric acid in the range of about 0 to 2.0%; the volatile acid comprising acetic acid in the range of about 0 to 5.0%; and, water in the range of about 2.0 to 10.0%.

2. The size composition of claim 1, wherein the nonionic lubricant is an emulsified mineral oil.

3. The size composition of claim 1, wherein the cationic lubricant is a polyethylenimine salt.

4. The size composition of claim 1, wherein the cationic lubricant is a condensate of tetraethylenepentaamine with stearic acid.

5. The composition of claim 1 comprising, in approximate parts by weight of the aqueous size composition:

| | |
|---|---|
| epoxy film former resin | 25.5 |
| nonionic lubricant | 39.7 |
| cationic lubricantr | 12.8 |
| γ-Methacryloxypropyl trimethoxy silane | 15.3 |
| γ-Aminopropyl triethoxy silane | 5.9 |
| Citric acid | .8 |
| Acetic | (0.03% mix weight) |

6. The composition of claim 5, wherein the nonionic lubricant is a sulphonated mineral oil.

7. The composition of claim 5, wherein the cationic lubricant is a polyamine.

* * * * *